Patented Aug. 1, 1933

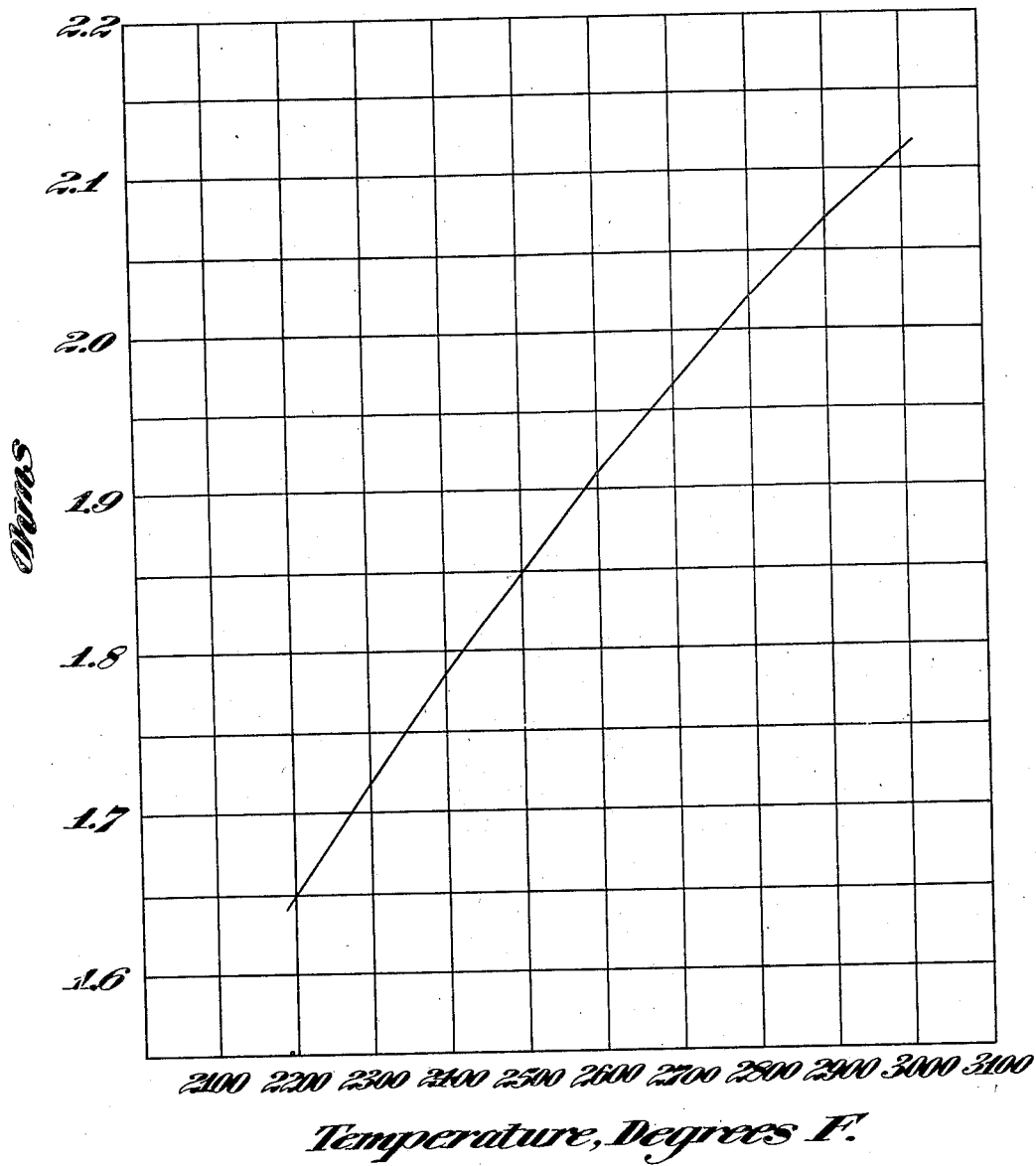

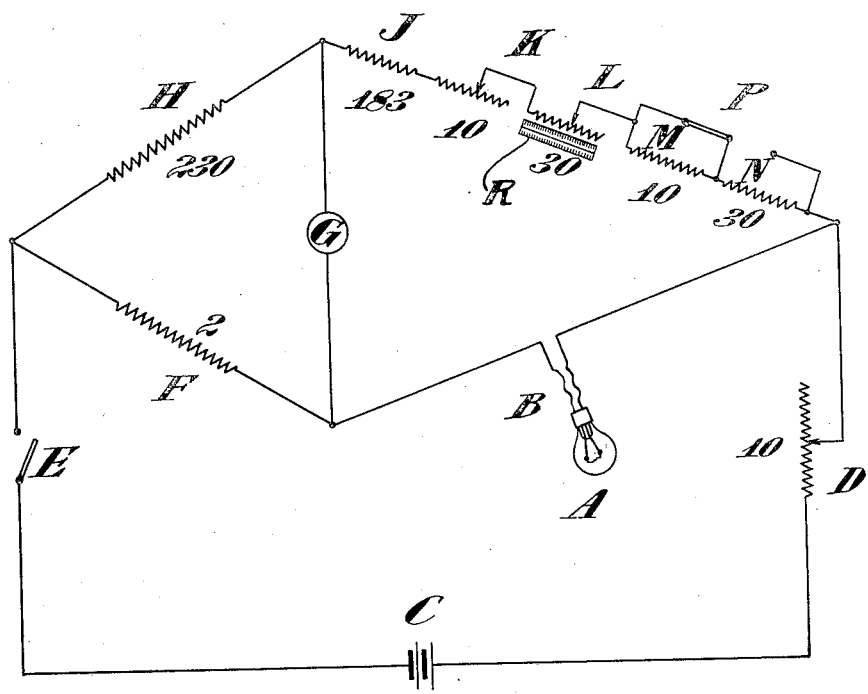

1,920,293

UNITED STATES PATENT OFFICE 1,920,293

OPTICAL PYROMETER

Earnshaw Cook, Baltimore, and Eric L. Anderson, Sparrows Point, Md., assignors to Bethlehem Steel Company, a Corporation of Pennsylvania Application October 12, 1929. Serial No. 399,325

1 Claim. (Cl. 88—14.)

This invention relates to optical pyrometers of what are commonly known as the disappearing filament type. Instruments of this kind are used for measuring the temperature of incandescent bodies by visually balancing the brilliance of the observed body against that of an incandescent filament. Transparent colored screens are generally interposed between the eye piece of the instrument and the filament. Electrical means are provided for measuring and controlling the temperature of the filament and the instruments are commonly calibrated by preparing scales or charts showing the relation between readings of the electrical measuring means and the temperature of the observed body.

Present practice is to use an ammeter or milliammeter of the common D'arsonval type for measuring the current through the filament of the standard lamp. Two serious objections to this method of measurement are that the meter is apt to be delicate and easily damaged or put out of calibration by rough-handling and that the relation between the brilliance of the filament and the current supplied to it on which the temperature calibration is based change continuously during the operating life of the standard lamp.

The object of our invention is to secure greater accuracy and convenience in operation than has been heretofore obtainable. It is based on our discovery that the relation between the brilliance of the standard lamp filament and its "hot resistance" is practically constant throughout the life of the lamp. By "hot resistance" we mean the ohmic resistance of the filament while burning as distinguished from its resistance as normally measured at approximately room temperature.

It is well known that an incandescent lamp filament increases in resistance during its operating life due to the vaporization of the material from which it is made, thereby reducing its cross section. This increase in resistance results in a diminution in the current carried by the filament for a given applied voltage. This, in turn, results in a lower power input to the filament for a given voltage. However, it is readily apparent from observation that the temperature of the filament as represented by its brilliance increases during its operating life, when subjected to definite current value. When a milliammeter is used to measure the current through the standard lamp in an optical pyrometer the relation between the current and the temperature of the observed body continuously changes so that it is necessary to use lower currents to represent a given temperature as the standard lamp ages.

We have found that the apparent temperature of a filament and the resistance of the filament while burning (hot resistance) bear a fixed relation to each other which is not appreciably changed by the increase in normal cold resistance during the life of the lamp, and that the variation of hot resistance with temperature is practically the same for all lamps of the same type. The relation of hot resistance to observed temperature for a typical standard lamp is shown by the attached chart, Fig. 1. Other lamps of the same type will have different resistances, but the slope of their temperature-resistance curves will be practically the same as that shown.

Our pyrometer as developed to make use of this discovery consists of a telescope containing a standard lamp by means of which the brilliance of the lamp filament may be compared or blended with that of the incandescent body upon which the telescope is sighted and of a measuring and control unit containing fixed and variable resistance elements, a galvanometer and a source of electric current. The telescope is attached to the control unit by means of flexible conductors.

In the drawings which form part of this specification, Fig. 1 is a graph representing the variation in resistance of a typical pyrometer lamp with varying temperatures of its filament. Fig. 2 is a diagram of connections used in the control and measuring unit of our improved pyrometer.

The construction of the telescope is immaterial to our invention. The electrical connections in the control box are shown in Fig. 2, in which A represents a standard lamp connected to the control box through flexible leads B. Current is supplied to the lamp by the dry cells C, through the control rheostat D, switch E and resistance F. Resistances H, J, K, L, M and N form a shunt to that portion of the circuit formed by resistance F and the standard lamp A. A galvanometer is connected between the two branches of the circuit so as to form a Wheatstone bridge. Resistances F and H are fixed and correspond to the known ratio arms of the common bridge. The standard lamp forms the unknown arm of the bridge. Variations in resistance of the lamp are balanced by adjustment of resistances K and L. The figures associated with the resistances shown in Fig. 2 represent ohms in a typical example of our invention. From these figures it will be noted that the total resistance of the branch made up by resistances H, J, K, L, M and N is very much higher than that of the branch made up of resistance F and the standard lamp. As a result, the current through the standard lamp may be accurately adjusted and subsequent small changes made in the resistances K and L without materially changing said current.

Variable resistance L has associated with its moving contact a double scale R calibrated in terms of temperature in two ranges. Resistance M or N may be short circuited by means of the double throw switch P, thereby permitting two ranges of resistances of the standard lamp to be balanced by adjustment of resistance L. One of the temperature scales associated with resistance L is applicable when resistance M is in circuit, the other when resistance N is in circuit. Resistance K permits adjustment in the measuring arm of the bridge to suit the resistance of various standard lamps so that calibration of resistance L will hold true for each. The operation of the instrument is as follows: Switch E is closed and control rheostat D is adjusted until the filament of the standard lamp equals in brilliance or blends with an incandescent body of known temperature. Resistance L is then set at the known temperature and resistance K adjusted until a balance is obtained as shown by the galvanometer. Variations in hot resistance of the lamp with temperature will then correspond with one of the calibrated scales associated with L. The scale used is chosen in accordance with the position of switch P. The telescope may then be sighted upon any incandescent body and the brilliance of the lamp lamp blended therewith by adjustment of control rheostat D. Resistance L is next adjusted until a balance is obtained whereupon the temperature of the body may be read on the proper scale.

It will be readily apparent that the calibrated resistance unit K provides a much more reliable means of measurement than a delicate milliammeter. While the galvanometer may have a sensitive movement similar in most respects to a milliammeter, its function as a null point indicator does not require the maintenance of calibration. We have found that when resistance K has been once set for a given lamp no further adjustment is required during the life of the lamp. The advantage of this constancy of calibration is obvious.

Having thus described our invention what we claim as new and desire to secure by Letters Patent is:

In an optical pyrometer of the disappearing filament type, a Wheatstone bridge comprising a branch containing a standard lamp and a low fixed resistance, a second branch consisting of a very high fixed resistance and one or more variable resistances having moving contacts, the total resistance of said second branch being substantially higher than that of said first branch, and scales associated with the moving contact of one of said variable resistances calibrated in terms of temperature.

EARNSHAW COOK.
ERIC L. ANDERSON.